United States Patent [19]

Takano

[11] Patent Number: 5,182,640
[45] Date of Patent: Jan. 26, 1993

[54] PROGRAM TRANSMISSION SYSTEM AND METHOD

[75] Inventor: Masayuki Takano, Tokyo, Japan
[73] Assignee: Sony Corporation, Tokyo, Japan
[21] Appl. No.: 512,448
[22] Filed: Apr. 23, 1990

[30] Foreign Application Priority Data

Apr. 27, 1989 [JP] Japan .................................... 108775

[51] Int. Cl.⁵ .......................................... H04N 7/10
[52] U.S. Cl. ..................................... 358/86; 455/53.1
[58] Field of Search ................. 455/2, 53; 358/86, 85, 358/84; 414/273

[56] References Cited

U.S. PATENT DOCUMENTS

| | | | |
|---|---|---|---|
| 4,381,522 | 4/1983 | Lambert | 358/86 |
| 4,516,166 | 5/1985 | Tellone | 360/72.1 |
| 4,724,491 | 2/1988 | Lambert | 358/86 |
| 4,734,005 | 3/1988 | Blumberg | 414/273 |
| 4,947,244 | 8/1990 | Fenwick et al. | 358/86 |
| 4,977,455 | 12/1990 | Young | 455/186 |
| 5,029,014 | 7/1991 | Lindstrom | 358/86 |

FOREIGN PATENT DOCUMENTS 0279411 8/1988 European Pat. Off. .
8606050 10/1986 World Int. Prop. O. .......... 414/273

OTHER PUBLICATIONS

SMPTE Journal Vol. 88, Jul. 1979, pp. 486-490; by H. Fix et al. "Design Criteria of Video Post Production Systems with Optimum Operational Editing Convenience".

SMPTE Journal vol. 93, No. 6, Jun. 1984, pp. 574-580; by L. McCroskey; "Manual and Automated Control of Multi-Channel Theater Sound Systems".

Primary Examiner—Curtis Kuntz
Assistant Examiner—Timothy H. Keough
Attorney, Agent, or Firm—Alvin Sinderbrand; William S. Frommer

[57] ABSTRACT

In a broadcast program transmission control apparatus and method using a scheduling computer to produce program scheduling signals representing a schedule of programs to be generated at predetermined times by respective ones of a plurality of program generation devices; each program generation device is provided with a corresponding controller into which the respective program scheduling signals are downloaded from the scheduling computer; and a switching device is operative to switch the programs generated by the program generation devices to a master broadcast output.

19 Claims, 5 Drawing Sheets

PROGRAM TRANSMISSION SYSTEM AND METHOD

BACKGROUND OF THE INVENTION

1. Field of the Invention

The present invention generally relates to an apparatus and method for controlling the sequential transmission of broadcast programs, for example, from a television broadcasting station.

2. Description of the Prior Art

Figure 1:
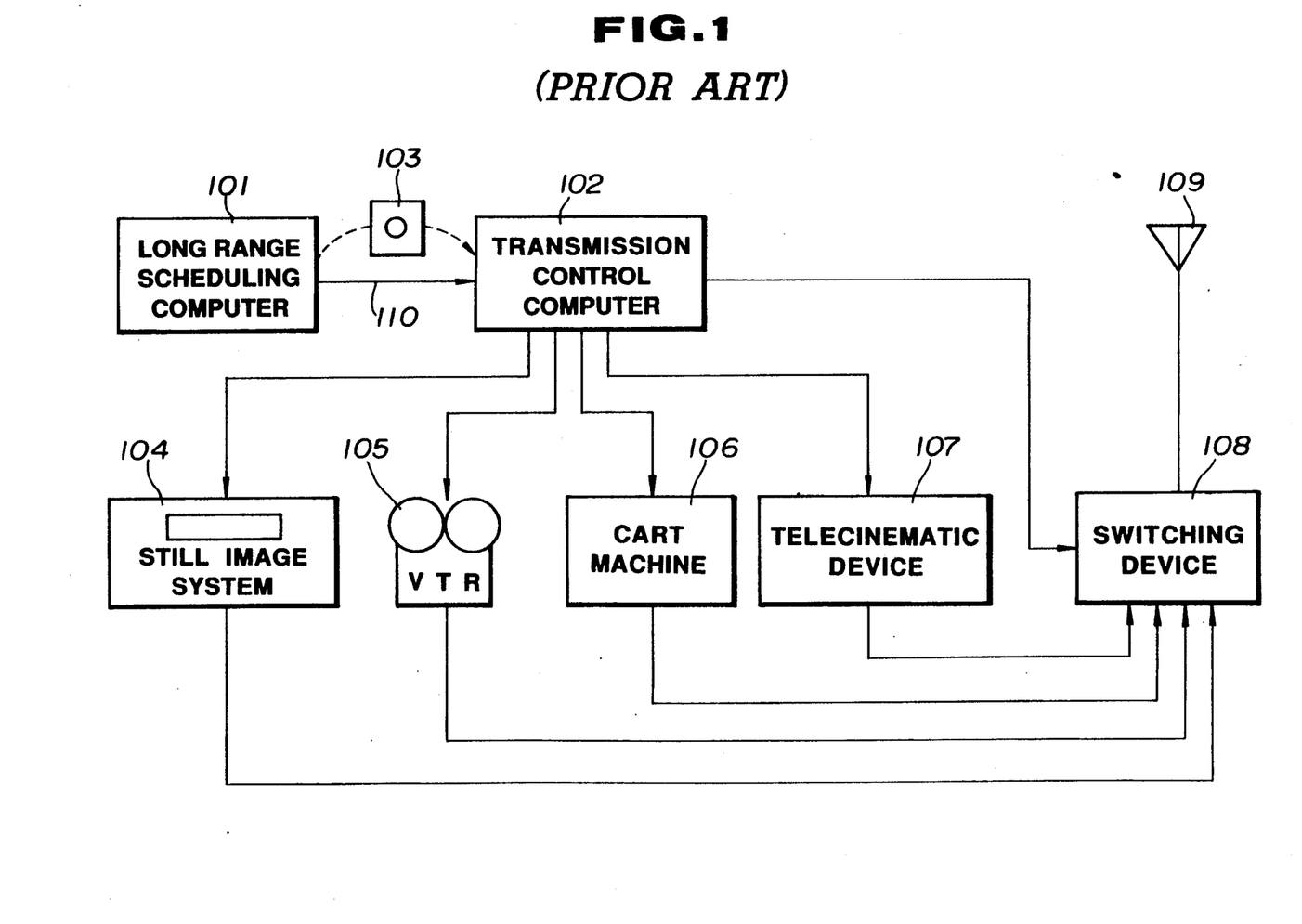
FIG. 1 is a block diagram showing an automatic program transmission control system of the prior art.

A conventional automatic program transmission system of a television broadcasting station is illustrated in FIG. 1 to comprise a long range scheduling computer 101 which generates long-term program schedule data, for example, a data file representing a weekly schedule of programs to be transmitted by the automatic program transmission system. Real-time control over the transmission of programs by the system is exercised by a transmission control computer 102. The weekly schedule of programs to be transmitted, also referred to as a play list, is provided by the long-range scheduling computer 101 to the transmission control computer 102 either by means of a transmission line 110 or via a recording medium, such as a floppy disk 103.

The transmission control computer 102 directly controls the production of programs broadcast from the station on the basis of the play list by issuing real-time commands to a plurality of program generation devices with the aid of clock signals supplied to the computer 102 by a station reference clock. In the automatic program transmission system of FIG. 1, four such program generation devices are illustrated. These include a still image system 104 and a video tape recorder (VTR) 105. Also included is a cart machine 106, which is operative, under the control of the transmission control computer 102, to select from among a large number of video tape cassettes in a storage magazine or library one cassette on which a desired program is recorded, to load the selected cassette into a video cassette player, and to locate and reproduce the desired program recorded on the cassette tape. The system also includes a telecinematic device 107 which is adapted to transform images stored on motion picture film to video signals. Each of the program generation devices 104-107 is directly turned on and off under the control of the transmission control computer 102 which exercises such control at intervals of one thirtieth of a second.

The transmission control computer 102 is also coupled with a switching device 108 which receives the video signals produced by the program generation devices 104-107 and is operative, under the control of commands received from the transmission control computer 102, to select the signals output by one of the devices 104-107 for transmission from a broadcast antenna 109.

Since the transmission control computer 102 exercises real-time control over all of the devices 104-108, while at the same time being required to exercise supervision over the play list data, the computer 102 must be a large scale device employing relatively complex software. In the event of an interruption in the broadcast schedule (for example, when a news bulletin must be broadcast), or in the event that a previously scheduled program must be changed or replaced by another, thus requiring that the play list be modified, the computer 102 must be reprogrammed. Consequently, not only must the schedule supervisory software of the transmission control computer 102 be rewritten, which is a relatively complex task, but it is necessary to interrupt the operation of the program generation device in use at the time of reprogramming.

Since the program transmission system must rely continuously on the transmission control computer 102 for its proper operation, if operation of the computer 102 is interrupted due to a power supply problem or other malfunction, the remainder of the system, including the program generation devices 104-107 and the switching device 108, are likewise disabled.

OBJECTS AND SUMMARY OF THE INVENTION

Accordingly, it is an object of this invention to provide an improved broadcast program transmission control apparatus and method which avoids the above mentioned disadvantages and problems associated with the prior art.

More specifically, it is an object of this invention to provide an improved broadcast program transmission control apparatus and method utilizing separate program schedule data processing and real-time device controlling in order to increase system reliability, reduce software complexity, and provide the ability to modify a play list or other program schedule data without interrupting real-time system operation.

Another object of the invention is to provide an improved broadcast program transmission control apparatus utilizing relatively inexpensive data processing devices, in place of a large scale computing device, thus reducing overall system cost.

It is a further object of this invention to facilitate the expandability of a broadcast program transmission control apparatus through the use of distributed real-time controllers linked with a common system-wide data bus utilizing a common protocol.

In accordance with an aspect of the present invention, a broadcast program transmission control apparatus comprises scheduling data producing means for providing program scheduling signals representing a schedule of programs to be generated at predetermined times by respective ones of a plurality of program generation devices having corresponding device control means; means for loading each device control means with the respective program scheduling signals from the scheduling data producing means; and switching means for switching the programs generated by the program generation devices to a master broadcast output.

In accordance with another aspect of this invention, a broadcast program transmission control apparatus comprises scheduling data producing means for providing program scheduling signals representing a schedule of programs to be generated at predetermined times by respective ones of a plurality of program generation devices; a plurality of device control means for controlling the operations of said plurality of program generation devices, respectively, and each including data storage means for storing respective program scheduling signals produced by said scheduling data producing means; means for loading the data storage means of each said device control means with its respective program scheduling signals from the scheduling data producing means; and switching means for switching the programs generated by the program generation devices to a master broadcast output.

In accordance with a further aspect of this invention, a method of controlling the transmission of programs by a broadcast program transmission apparatus comprises the steps of: producing program transmission data signals representing a schedule of programs to be produced by a plurality of program generation devices; dividing the program transmission data signals into respective device program schedule signals for controlling the generation of programs by corresponding ones of the program generation devices; storing each of the divided device program schedule signals in an undivided controller for the corresponding program generation device; and switching the programs generated by the plurality of program generation devices to a master broadcast output with the use of a switching means.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF THE PREFERRED EMBODIMENT

Figure 2:
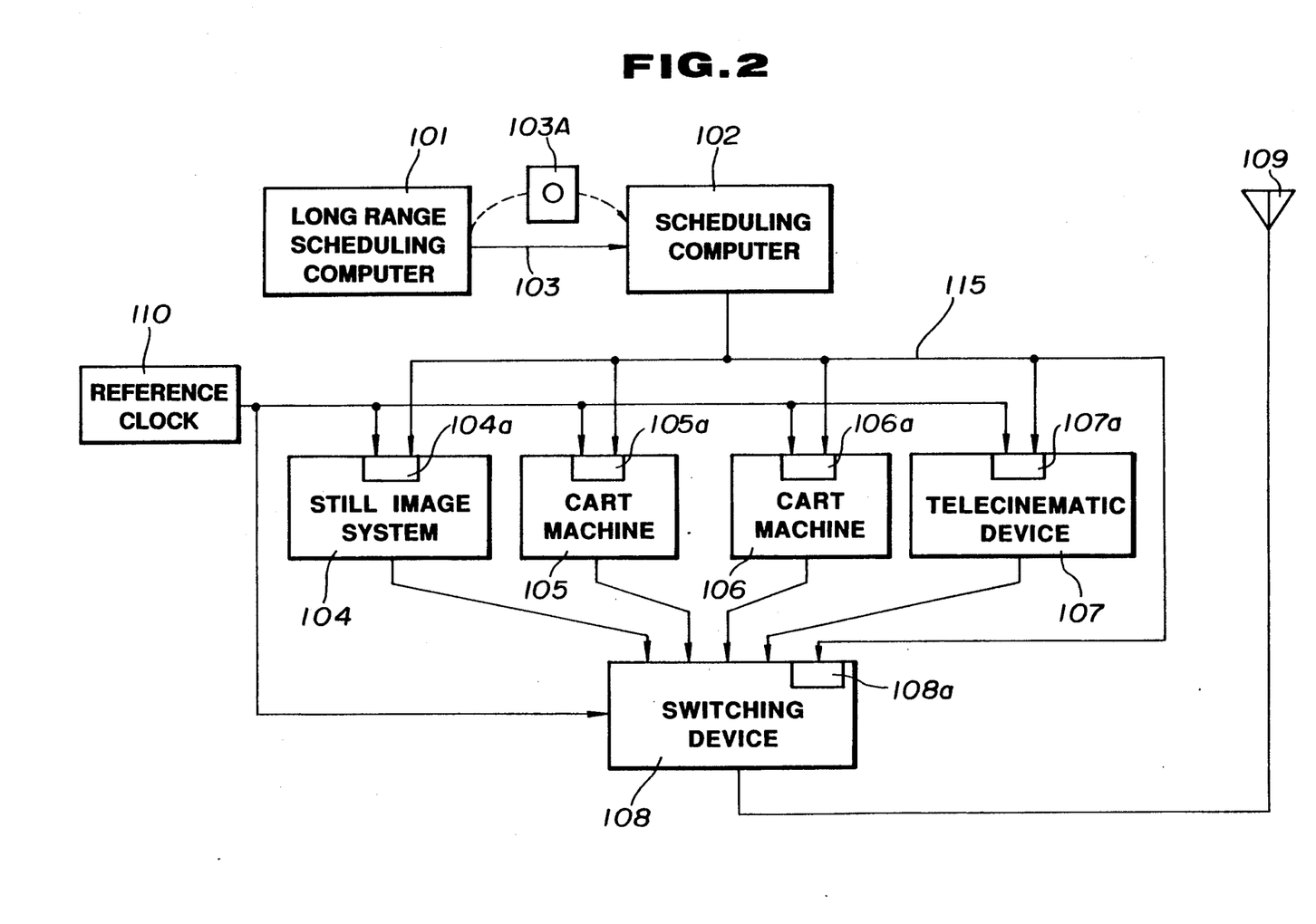
FIG. 2 is a block diagram showing an automatic program transmission control system in accordance with an embodiment of the present invention.

Referring to the drawings in detail, and presently to FIG. 2 thereof, it will be seen that, in an automatic program transmission control system in accordance with an embodiment of the present invention, a long range scheduling computer 1 stores a long-term schedule of programs, or play list, to be broadcast, for example, during the course of a week. As used herein, the term "programs" includes not only entertainment programs and commercials, but also any integral collection of signals to be broadcast. The play list is supplied to a scheduling computer 2 either by means of transmission through a transmission line 3 or via a recording medium, such as a floppy disk 3A.

The scheduling computer 2 is programmed with the identity of a particular program generation device to be used in producing each program in accordance with the play list. In the program transmission system illustrated in FIG. 2, such program generation devices include a still image system 4, cart machines 5 and 6, and a telecinematic device 7. The still image system 4 is operative to automatically replay still images that have been digitally recorded on erasable optical disks and to simultaneously replay audio signals from a digital audio file during the still broadcast. The cart machines 5 and 6 are operative under the control of signals provided by the scheduling computer 2 to physically locate and extract a video cassette having a desired program recorded thereon, for example, from a video cassette library. The cart machines 5 and 6 are each operative thereupon to load the video cassette selected thereby into a video cassette player and reproduce the desired program at the predetermined time under the control of scheduling data provided by the scheduling computer 2. Once the desired program has been reproduced from a video cassette by the cart machine, the machine automatically returns such video cassette to its storage location in the library or magazine. The telecinematic device 7 automatically produces video signals from optical images on moving picture film under the control of scheduling data received from the scheduling computer 2.

Each of the program generation devices 4–7 includes a respective device controller 4a–7a which directly controls the operation of its respective device 4–7 on a real time basis in accordance with program scheduling data supplied thereto by the scheduling computer 2. The scheduling computer 2 is coupled with each of the device controllers 4a–7a by means of a common data bus 15 to which the scheduling computer 2 supplies program scheduling data to be transmitted thereby to the device controllers 4a–7a. Such program scheduling data is provided by the scheduling computer 2 with identification codes for the respective devices 4–7 to be controlled by the respective program scheduling data. Each of the device controllers 4a–7a has an input port coupled with the common data bus 15 to receive the program scheduling data transmitted thereby and includes a data storage or memory controlled by a respective central processing unit (CPU) which recognizes the correspondingly coded program scheduling data and stores the same in the respective memory as a series of commands for the operation of the device controller 4a–7a in controlling the production of the programs indicated thereby with the use of the respective program generation device 4–7.

The program scheduling data is supplied by the scheduling computer 2 to each controller 4a–7a on a non-real time basis for subsequent use by the respective device controller 4a–7a as commands governing its real time operation. In addition, a common protocol is utilized for program scheduling data provided by the scheduling computer 2 over the data bus 15 to the device controllers 4a–7a, which facilitates expansion of the system to accommodate additional device controllers and program generation devices. In addition, the use of a single bus and common protocol to provide the scheduling data to all of the devices 4–7 simplifies data transmission therebetween and as well as system installation.

Each of the device controllers 4a–7a is coupled with a station reference clock 10 to receive a station reference clock signal and a linear time code (LTC) signal which indicates a standard station date, time and frame number. The reference clock and LTC signals are utilized by each of the controllers 4a–7a to synchronize the production of programs thereby on a real-time basis.

The devices 4–7 provide the video and audio signals produced thereby to respective inputs of a switching device 8 which automatically selects the video and audio signals from one of said inputs to be provided to a master broadcast output coupled with a broadcast antenna 9. Thus, the antenna 9 is provided with a continuous transmission of video and audio signals to be broadcast. The switching device 8 includes a switching device controller 8a which comprises data storage means coupled with the common data bus 15 to receive coded switching schedule data from the scheduling computer 2. The switching device controller 8a also comprises a central processing unit (CPU) operative in accordance with a stored program to recognize the coded switching schedule data when it is present on the common data bus 15 and to distinguish such switching schedule data from program scheduling data intended to be stored in the device controllers 4a–7a. Upon recognizing such switching schedule data, the CPU of the controller 8a is operative to store said switching schedule data in the storage or memory of the switching device controller 8a. The switching schedule data is produced by the scheduling computer 2 to represent a relatively short term transmission schedule and takes the form of switching commands which determine the sequence and timing of the aforesaid switching operations to be carried out by the switching device 8. As in the case of the program scheduling data also supplied by the scheduling computer 2 to the device controllers 4a–7a, the switching schedule data provided by the scheduling computer 2 to the switching device controller 8a is provided on a non-real-time basis. Real-time control over the switching operations of the switching device 8 in accordance with the switching commands provided by the scheduling computer 2 is exercised by the switching device controller 8a. The switching device 8 is coupled with the reference clock 10 to receive the station reference clock and LTC signals therefrom which are utilized by the switching device controller 8a for synchronizing the operations of its respective switching device 8 therewith.

Figure 3:
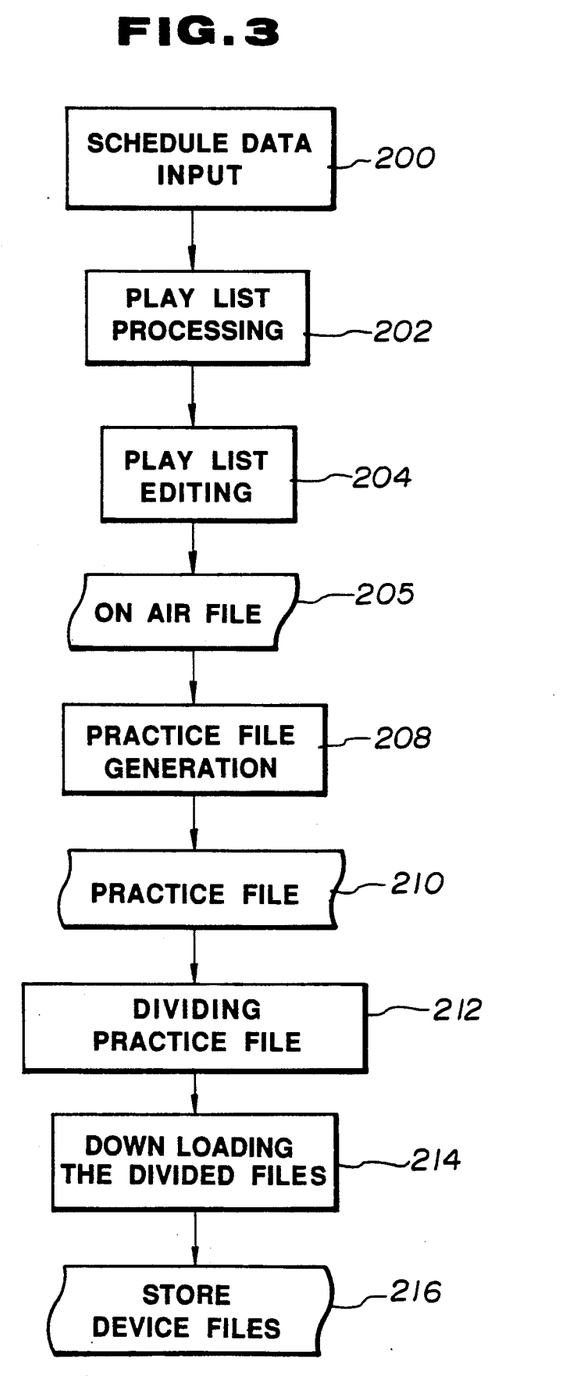
FIG. 3 illustrates a sequence of operations performed by a scheduling computer of the embodiment of FIG. 2.

Referring now to FIG. 3, which is a flow chart illustrating the operation of the scheduling computer 2 in generating program scheduling data for the control of the devices 4–7 and switching schedule data for the control of the switching device 8, it will be seen that, in a first step 200, data representing a long term schedule of programs or play list produced by the long range scheduling computer 1 is input to the scheduling computer 2 either by means of floppy disk 3A or over transmission line 3, as aforesaid, and is stored in the computer 2 for further data processing. In the next step 202, the scheduling computer 2 rearranges the play list input from the long range scheduling computer 1 into a proper time sequence. Once the play list has been thus rearranged in accordance with step 202, it may be edited from time to time, as indicated in step 204, without interrupting the real-time operation of the program generation devices 4–7, or of the switching device 8. As indicated in step 205, the edited play list produced in accordance with step 204 is stored by the scheduling computer 2 in an on-air data file.

From time to time, the scheduling computer 2 generates a practice file, as indicated in step 208, from the on air file. The practice file comprises a portion of the play list representing programs to be broadcast in the near future, for example, in the course of a morning. Once generated, the practice file is stored for further data processing as indicated by step 210.

In the following step 212, the stored practice file is divided by the scheduling computer 2 into program generation device files and a switching device file respectively representing the timing and sequence of programs to be produced by corresponding ones of the program generation devices 4–7, and switching schedule data representing the timing and sequence of switching operations to be carried out by the switching device 8 over the period of time represented by such practice file. In a subsequent step 214, the scheduling computer 2 downloads the divided device files and the switching device file, each having an appropriate device identification code, to the respective program generation devices 4–7 and the switching device 8. Such downloading is effected over the common data bus 15 on a non-real-time basis and in a manner consistent with uninterrupted operation of the program generation and switching devices. In a subsequent step 216, each of the device controllers 4a–7a and the switching device controller 8a recognizes its respective identification code in the corresponding device file and stores the latter in the respective memory.

Figure 4:
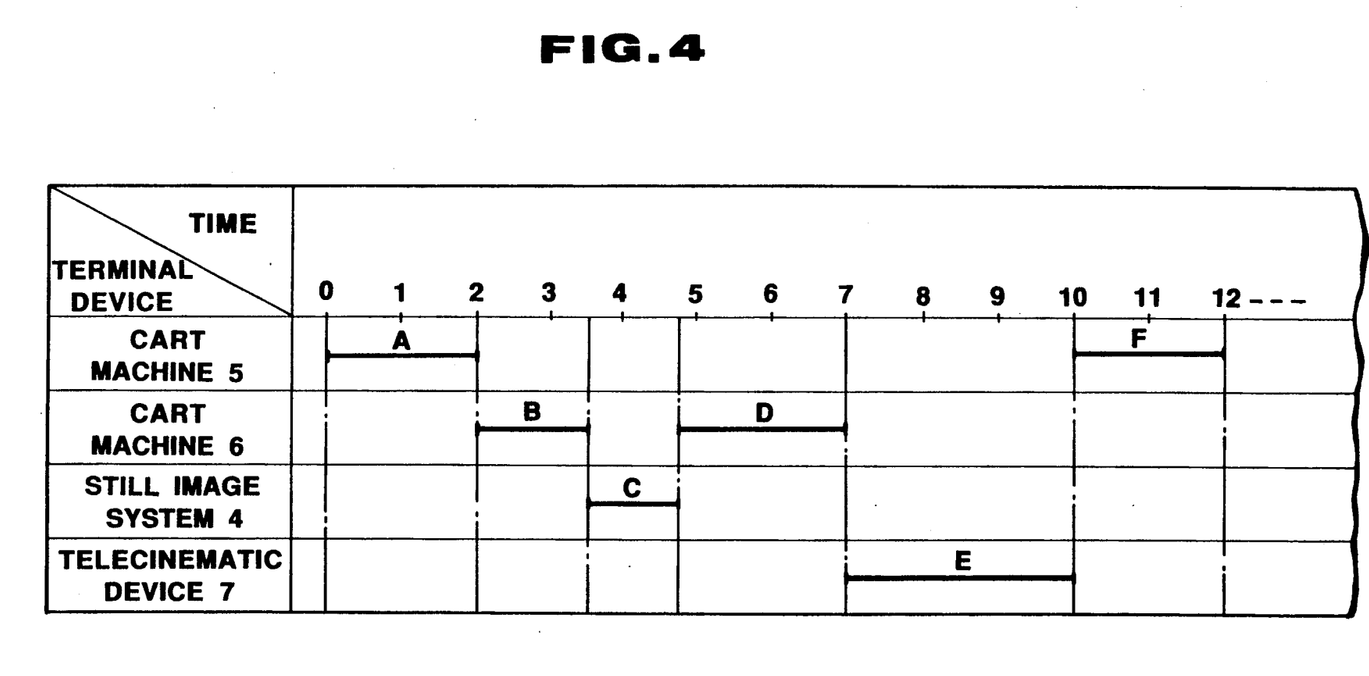
FIG. 4 is a timing chart illustrating, by way of example, the operation of various program generation devices of the automatic program transmission system of FIG. 2 over a period of time.

With reference now to FIG. 4, which is a timing chart showing an example of the operational timing of each of the program generation devices 4–7 over the course of a morning, the times during which each of the devices 4–7 is operated over this period of time to produce programs are indicated by horizontally extending line segments A through F. Accordingly, FIG. 4 may be regarded as a graphical representation of an exemplary practice file produced by the scheduling computer 2 for defining the sequence and timing of respective device operations during that time period. Therefore, in the example of FIG. 4, the cart machine 5 will be operative during the time periods midnight to 2:00 a.m. and 10:00 a.m. to 12:00 noon to produce programs in accordance with the device file of the cart machine 5 downloaded to the respective device controller 5a by the scheduling computer 2. Likewise, cart machine 6 will be operative from the period 2:00 a.m. until 3:30 a.m., and again from 4.45 a.m. until 7:00 a.m. to produce programs in accordance with its respective device file received by the device controller 6a from the scheduling computer 2. In the same manner, the still image system 4 is operative from 3:30 a.m. until 4:45 a.m., and the telecinematic device 7 is operative from 7:00 a.m. until 10:00 a.m. to each produce a sequence of programs predetermined by their respective device files downloaded thereto by the scheduling computer 2.

As illustrated by the timing chart of FIG. 4, each of the program generation devices 4–7 stores in the respective controller 4a–7a a schedule of programs to be generated thereby in the form of a device file downloaded thereto by the scheduling computer 2 and is operative on the basis of the contents of such device file to produce the programs determined thereby at the predetermined timing, as indicated by the operational time ranges A to F shown in FIG. 4. As described above, the switching device 8a is also provided with respective switching schedule data in the form of a respective device file downloaded to the controller 8a by the scheduling computer 2, so that the operation of the switching device 8 is operated in real-time by its switching device controller 8a independent of real-time control by the scheduling computer 2.

Accordingly, the automatic program transmission system embodyinq the present invention is seen to be a hierarchically-structured system wherein the scheduling computer 2 does not become involved with real-time control of the individual devices 4–8 and, therefore, may be advantageously selected as a small scale and relatively inexpensive data processing device. In the same fashion, the reduced operational demands on the scheduling computer 2 results in relatively less complex software to control its operation.

Figure 5:
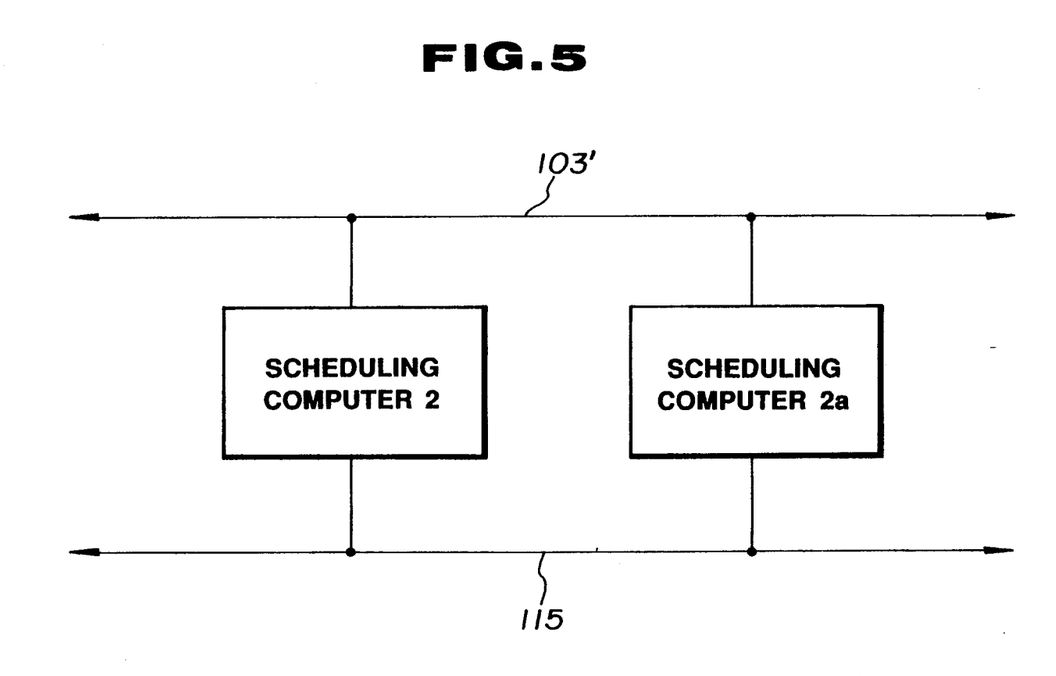
FIG. 5 is a block diagram of another embodiment of the present invention utilizing plural scheduling computers.

The automatic program transmission system embodying the present invention affords greater reliability than the prior art system since the devices 4-8 can continue operating even in the event of a malfunction or loss of power by the scheduling computer 2. Referring now to FIG. 5, it will be seen that, in a particularly advantageous embodiment of the present invention, a plurality of scheduling computers 2 and 2a may be provided to afford redundant control of an automatic program transmission system. Each of the scheduling computers 2 and 2a has an input port coupled with a transmission network 3' to receive long term program scheduling data from a long range scheduling computer, such as, the computer 1 in FIG. 2. In addition, the transmission network 3' is used by the scheduling computers 2 and 2a as a common data bus to enable the computers 2 and 2a to share a common database. Each of the scheduling computers 2 and 2a is also coupled with the common device control data bus 15 by which a respective one of the scheduling computers 2 and 2a transmits program schedule data to the devices 4-7 of FIG. 2, as well as switching schedule data to control the operation of the switching device 8 thereof. Accordingly, in the event that one of the scheduling computers 2 and 2a which is in operation to provide commands to the device controllers 4a-8a becomes inoperative, the other of the scheduling computers 2 and 2a may then be utilized to carry on the operations of the then inoperative computer.

It will be appreciated that the automatic program transmission control system embodying the present invention affords the ability to modify or supplement a play list without requiring extensive software modifications, as in the conventional system, and without any interference with the real-time operation of the system. In other words, the data processing operation necessary to rearrange the play list as a consequence of program editing may be carried on by the scheduling computer completely independently of all real-time operations of the program generation devices and switching device.

It will be appreciated further that, through the use of bus-type system interconnections, system installation is advantageously simplified and through the use of a common protocol for data transmission among the interconnected equipment, system expansion likewise is simplified.

Although specific embodiments of the invention have been described in detail herein with reference to the accompanying drawings, it is to be understood that the invention is not limited to those precise embodiments, and that various changes and modification may be effected therein by one skilled in the art without departing from the scope or spirit of the invention as defined in the appended claims.

What is claimed is:

1. A broadcast program transmission control apparatus, comprising:

a plurality of program generation devices each including respective device control means for each controlling the operation of its respective program generation device in real time;

scheduling data producing means for producing program scheduling signals representing a schedule of programs to be generated at predetermined future times by respective ones of said program generation devices;

each said respective device control means being operative to store corresponding ones of said program scheduling signals representing a corresponding schedule of programs to be generated by its respective program generation device;

means for loading each said device control means with said program scheduling signals from the scheduling data producing means representing the schedule of programs to be generated by its respective program generation device; and switching means for switching the programs generated by said program generation devices to a master broadcast output.

2. The broadcast program transmission control apparatus according to claim 1, wherein said means for loading each said device control means with a respective program scheduling signals comprises:

common data bus means coupled with said scheduling data producing means to receive the program scheduling signals therefrom for transmitting said program scheduling signals, and means for coupling the common data bus with an input port of each said device control means to provide the program scheduling signals thereto.

3. The broadcast program transmission control apparatus according to claim 2, wherein the scheduling data producing means is operative to provide said program scheduling signals intended for said respective ones of said plurality of program generation devices in accordance with a common data protocol wherein the program scheduling signals intended for each respective program generation device include an identification code for uniquely identifying said respective program generation device.

4. The broadcast program transmission control apparatus according to claim 1, wherein said scheduling data producing means includes means for receiving input program scheduling data representing programs to be generated by a plurality of said program generation devices, and means for producing said program scheduling signals for respective ones of said plurality of program generation devices from said input program scheduling data.

5. The broadcast program transmission control apparatus according to claim 1, wherein said scheduling data producing means includes a plurality of data processing means for each producing said program scheduling signals, and wherein said means for loading each device control means includes means for receiving the program scheduling signals from a selected one of said plurality of data processing means.

6. The broadcast program transmission control apparatus according to claim 5, wherein said means for loading each device control means includes common data bus means coupled with each of said plurality of data processing means to receive the program scheduling signals therefrom for transmitting said program scheduling signals to said plurality of device control means.

7. The broadcast program transmission control apparatus according to claim 5, further comprising a common input data bus to which an input port of each of said plurality of data processing means is coupled to receive input program scheduling data representing programs to be generated by a plurality of said program generation devices.

8. The broadcast program transmission control apparatus according to claim 1, wherein the scheduling data producing means includes means for producing switching sequence data signals representing a sequence of switching operations to be carried out by said switching means; and wherein said switching means includes switching control means for controlling the operation of the switching means on the basis of the switching sequence data signals produced by the scheduling data producing means, and switching data loading means for loading the switching sequence data signals in said switching control means.

9. The broadcast program transmission control apparatus according to claim 8, wherein said switching data loading means includes a common data bus coupled with said scheduling data producing means to receive said switching sequence data signals and said program scheduling signals, and coupled with each of said device control means and said switching control means to provide said program scheduling signals and said switching sequence data signals in common to all of said device control means and said switching control means.

10. A broadcast program transmission control apparatus, comprising:

scheduling data producing means for producing program scheduling signals representing a schedule of programs to be generated at predetermined future times by respective ones of a plurality of program generation devices;

a plurality of program generation devices each including a respective device control means for said program generation device in real time, each of said device control means including data storage means for storing respective program scheduling signals produced by said scheduling data producing means and representing a schedule of programs to be generated by the respective program generation device;

means for leading said data storage means of each said device control means with its respective program scheduling signals from the scheduling data producing means; and switching means for switching the programs generated by the program generation devices to a master broadcast output.

11. The broadcast program transmission control apparatus according to claim 10, further comprising means for providing a reference clock signal to each of said device control means and to said switching means for synchronizing the real-time operation thereof.

12. The broadcast program transmission control apparatus according to claim 10, wherein said means for loading said data storage means comprises common data bus means for transmitting the program scheduling signals form said scheduling data producing means in common to all of said data storage means of said device control means.

13. The broadcast program transmission control apparatus according to claim 10, wherein:

the scheduling data producing means includes means for producing switching sequence data signals representing a sequence of switching operations to be carried out by the switching means; and wherein the switching means includes switching control means for controlling the operation of switching means on the basis of the switching sequence data signals produced by the scheduling data producing means, and switching data loading means for loading the switching sequence data signals in said switching control means.

14. The broadcast program transmission control apparatus according to claim 13, wherein said means for loading said data storage means with the respective program scheduling signals and said switching data loading means include common data bus means for receiving the program scheduling signals and the switching sequence data signals from the scheduling data producing means and transmitting said program scheduling signals and said switching sequence data signals in common to said data storage means of each said device control means and to said switching control means.

15. A method of controlling the transmission of programs by a broadcast program transmission apparatus, said method comprising the steps of:

producing program transmission data signals representing a schedule of programs to be produced by a plurality of program generation devices;

sorting the program transmission data signals into respective device program schedule signals for controlling the generation of programs by corresponding ones of the program generation devices at a future time;

storing each of the respective device program schedule signals in a corresponding device control means of each of the program generation devices for controlling the generation of programs by the respective program generation device in real time; and switching the programs generated by said plurality of program generation devices to a master broadcast output with the use of a switching means.

16. The method of claim 15, further comprising the step of providing a common reference clock signal to said device control means and to said switching means for synchronizing the operations of said device control means and said switching means.

17. The method of claim 15, wherein:

the step of sorting the program transmission data signals into respective device program schedule signals comprises providing each of the respective device program schedule signals with an identification code for identifying the corresponding device to be controlled therewith; and the step of storing each of the device program schedule signals in a corresponding device control means comprises providing the respective device program schedule signals having said identification codes in common to all of said device control means.

18. The broadcast program transmission control apparatus of claim 1, wherein at least one of said plurality of program generation devices includes a video cassette reproducing means for reproducing a program from a selected one of a plurality of video cassettes stored by said video cassette reproducing means.

19. The broadcast program transmission control apparatus of claim 10, wherein at least one of said plurality of program generation devices includes a video cassette reproducing means for reproducing a program from a selected one of a plurality of video cassettes stored by said video cassette reproducing means.

* * * * *